United States Patent [19]

Donaldson

[11] Patent Number: 4,601,110
[45] Date of Patent: Jul. 22, 1986

[54] FIXTURE DEVICE

[75] Inventor: Charles W. Donaldson, Blanchester, Ohio

[73] Assignee: General Electric Company, Cincinnati, Ohio

[21] Appl. No.: 685,106

[22] Filed: Dec. 21, 1984

Related U.S. Application Data

[62] Division of Ser. No. 477,272, Mar. 21, 1983, Pat. No. 4,509,265.

[51] Int. Cl.$^1$ .................. G01B 5/20; G01B 11/24
[52] U.S. Cl. ........................... 33/547; 33/552; 33/573; 250/561
[58] Field of Search .............. 33/547, 549, 573, 552; 356/244, 356, 376; 250/560, 561; 73/103, 195

[56] References Cited

U.S. PATENT DOCUMENTS

| | | | |
|---|---|---|---|
| 2,629,936 | 3/1953 | Cronstedt | 33/547 |
| 3,690,160 | 9/1972 | Kriesten | 73/95 |
| 3,802,255 | 4/1974 | Struthers et al. | 73/103 |
| 3,900,738 | 8/1975 | McKay, Sr. | 250/561 |
| 4,523,850 | 6/1985 | Covey et al. | 250/561 |

FOREIGN PATENT DOCUMENTS 981222 1/1965 United Kingdom ............. 33/552

Primary Examiner—Willis Little
Attorney, Agent, or Firm—Gregory A. Welte; Derek P. Lawrence

[57] ABSTRACT

An invention is disclosed for positioning an object wherein three point supports provide three contact points which define a first plane. Three additional point supports provide three additional contact points which are not coplanar with the first plane and which define a second plane. The first and second planes are nonperpendicular. The point supports accurately and repeatably position the object for optical measurement of a dimension of the object. The invention can be used in connection with the quality control testing of weldments which attach blade tips to gas turbine engine blades.

4 Claims, 14 Drawing Figures

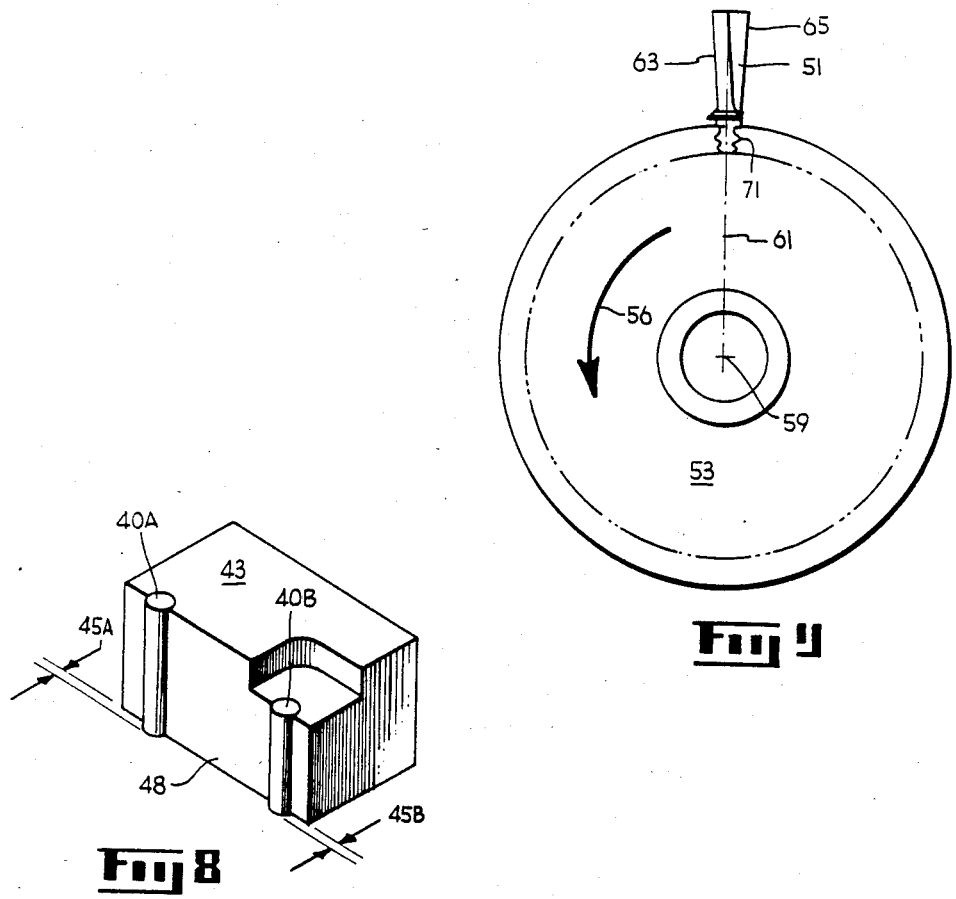

FIXTURE DEVICE

The invention herein described was made in the course of or under a contract or subcontract thereunder (or grant) with the Department of the Navy.

This is a division of application Ser. No. 477,272, filed Mar. 21, 1983, now U.S. Pat. No. 4,509,265.

The present invention relates to fixturing devices and, more particularly, to such devices which position an object in space with repeatably high accuracy for measurement purposes.

BACKGROUND OF THE INVENTION

One method of ascertaining the quality of a diffusion-bonded weldment requires the measurement of the weldment's thickness. This measurement can be undertaken as shown in FIG. 1, which illustrates a caliper 2 having anvils 4 and 6 measuring the total thickness of two bonded components 8 and 10 together with the weldment 12 contained between them. Comparison of this total measured thickness with the measured total thickness of the two components without the weldment, prior to bonding, will allow a computation of the thickness of the weldment by subtraction. As will now be discussed, accurate measurement requires accurate positioning of the anvils 4 and 6 with respect to the components 8 and 10. Such positioning is commonly called fixturing.

If one of the components has a rough surface, such as the surface of a metallic casting taken directly from a sand mold, problems arise in the thickness-measuring procedure. One problem is illustrated in FIG. 2, which shows two possible positions of the anvil 6 of FIG. 1, but in enlarged form and labeled as 6A and 6B. The surface 9 of the component 10 is rough and, as the alternate positions 6A and 6B of the anvil 6 indicate, the measured thickness of the components 8 and 10 in FIG. 1 will depend upon the anvil position chosen. Thus, the measured thickness has no absolute definition.

Further, even if no absolute measurement is sought, but only a relative comparison of two successive measurements, problems arise. Accurate comparison requires that the anvils 4 and 6 be positioned exactly in the same position, such as the position 6B for anvil 6, for both measurements. This is difficult to achieve.

Still further, it is possible that the components 8 and 10 may become nicked or scratched between measurements. If a scratch occurs at the location where the anvil 6 contacts the component, random error is introduced. All of these problems are worsened when the components 8 and 10 are of irregular shapes, as are sand-cast gas turbine engine blades.

OBJECTS OF THE INVENTION

It is an object of the present invention to provide a new and improved fixturing device.

It is a further object of the present invention to provide a new and improved fixturing device for accurately and repeatably positioning an object in space.

It is a further object of the present invention to provide a new and improved fixturing device for positioning an object therein for ascertaining the integrity of a weldment through measurement of the weldment's thickness.

It is a further object of the present invention to provide a new and improved fixturing device which does not use flat surfaces to contact the object to be fixtured to thereby reduce the effects which nicks and scratches on the object otherwise have upon the positioning of the flat surfaces.

It is a further object of the present invention to provide a new and improved fixturing device for positioning a gas turbine engine blade in space for ascertaining the integrity of a weldment therein by measurement of the weldment's thickness.

SUMMARY OF THE INVENTION

In one form of the present invention, six point supports are fastened to a bracket at six predetermined positions to support an object. Three of the point supports define a first plane, and the remaining three define a second plane. The remaining three must not be coplanar with the first three point supports, and the first and second planes must be nonperpendicular.

BRIEF DESCRIPTION OF THE DRAWINGS

FIG. 8 illustrates part of the apparatus of FIG. 7.

FIG. 9 illustrates reference directions of a turbine engine blade.

FIGS. 13A—B illustrate the shapes of portions of the sheet of light which are eclipsed by the feeler pin of FIG. 11.

DETAILED DESCRIPTION OF THE INVENTION

Figure 1:
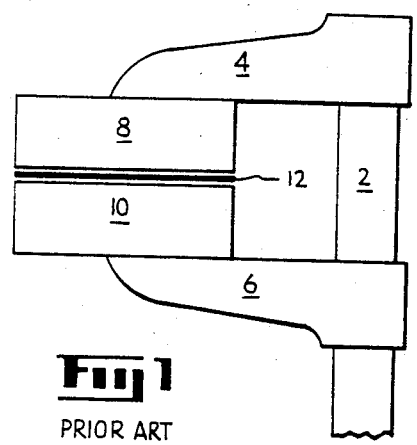
FIG. 1 illustrates two components and a weldment between them being measured in thickness.
Figure 2:
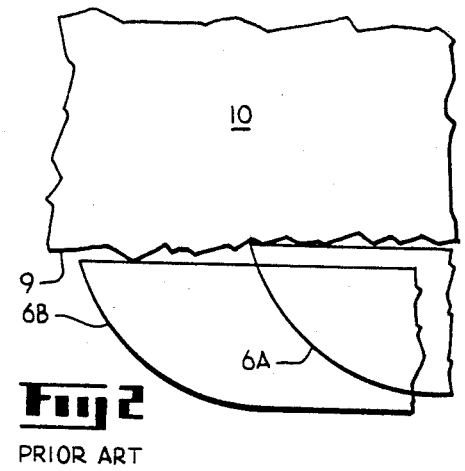
FIG. 2 illustrates an enlarged view of part of FIG. 1.
Figure 3:
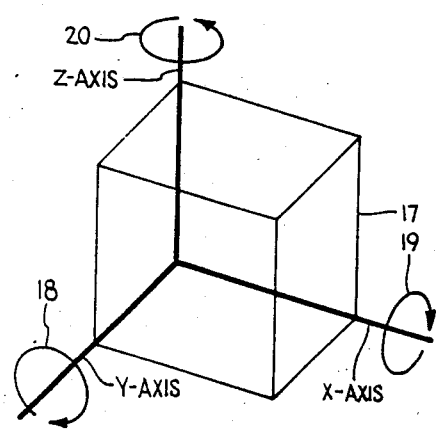
FIG. 3 illustrates an object in a coordinate system.

FIG. 3 illustrates a coordinate system containing X-, Y-, and Z-axes. An object 17 positioned in the coordinate system possesses six degrees of freedom. The object 17 can slide parallel to itself (that is, translate) along any of the three axes, thus illustrating three degrees of freedom. (Positive and negative translations, that is translations in opposite directions but along the same axis, are herein considered to provide a single degree of freedom.) Further, the object 17 can rotate about any of the three axes, that is, in the directions shown by arrows 18, 19, and 20, thus exhibiting three additional degrees of freedom.

Figure 4:
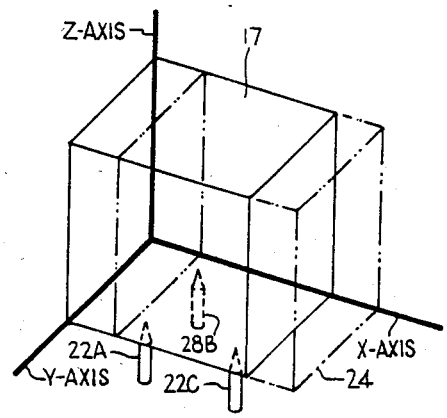
FIGS. 4, 5, and 6 illustrate various principles of support of the object of FIG. 3 utilized by the present invention.

FIG. 4 illustrates part of one form of the present invention used to fixture the object 17 and eliminate all degrees of freedom. The object 17 is supported by three point supports 22A–C which define a plane, namely, the X-Y plane. The point supports 22A–C can resemble pencil points in size and shape, but are constructed of a more durable material, such as steel.

The object 17 can slide along the X-axis to occupy the phantom outline 24; it can similarly slide along the Y-axis (sliding not shown); and it can rotate (not shown) about the Z-axis, all despite being in contact with the three point supports 22A—C. That is, three degrees of freedom remain. These three degrees are the following: translation in the X-direction, translation in the Y-direction, and rotation about the Z-axis. (Rotation about an axis is said to occur either when an object rotates about that axis, or about a line parallel to the axis.)

Figure 5:
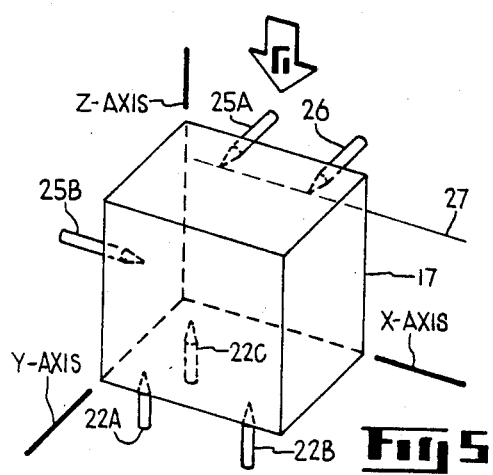
Figure 6:
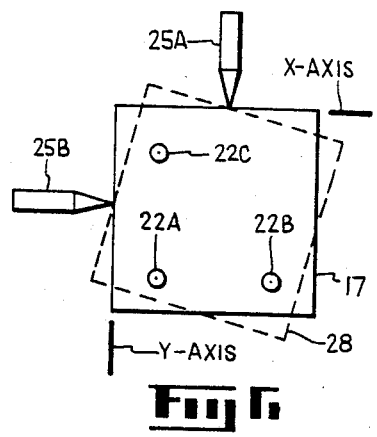

FIG. 5 shows the addition of two further point supports 25A and 25B to the embodiment of FIG. 4. (Point support 26 is shown but not yet to be considered.) These two point supports 25A and 25B prevent respective translations along the Y- and X-axes, but, as FIG. 6 shows (FIG. 6 being a top view of FIG. 5), the object 17 can still rotate about the Z-axis as shown by phantom outline 28 and still contact all five point supports 22A–C and 25A–B. One degree of freedom still remains. However, one additional point support, namely point support 26 in FIG. 5, will eliminate the remaining degree of freedom, provided that the object 17 is kept in contact with all six points supports 22A–C, 25A–B, and 26.

The six support points can be viewed as simultaneously providing three point supports such as 22A, 25A, and 25B to eliminate the three translational degrees of freedom and, in addition, three pairs of point supports, such as pairs 22A and C, 22A and B, and 25A and 26, to eliminate the three rotational degrees of freedom.

Viewed another way, the three point supports 22A–C define a plane (the X-Y plane) at the points at which they contact the object 17 (i.e., at first, second, and third contact points). The two point supports 25A and 26 define a line 27 by their own two contact points (i.e., fourth and fifth contact points) on the object 17. This line must be noncoplanar with, and nonperpendicular to, the plane defined by the first, second and third contact points. Otherwise, a situation analogous to that shown in FIG. 6 can occur, since the point support 26 would lie directly beneath point support 25A if the line 27 were perpendicular to the X-Y plane. The last point support, 25B, must provide a sixth contact point which fulfills three conditions. One, the sixth contact point must be noncoplanar with the first, second, and third contact points because, if coplanar, the sixth contact point adds nothing to their functions. Two, the sixth contact point must be noncolinear with the fourth and fifth contact point for a similar reason. Three, the sixth contact point must, together with the fourth and fifth contact points, define a plane which is nonperpendicular with the plane of the first, second, and third contact points: if perpendicular, with reference to FIG. 5, the sixth contact point would lie in the X-Z plane and translation of the object 17 in the negative X-direction would not be prevented.

Viewed still another way, the three point supports 22A–C define a first plane by their contact points and the three point supports 25A–B and 26 define a second plane. (The requirement that point support 25B be noncolinear with point supports 25A and 26 results in the three point supports 25A–B and 26 defining a plane.) The point supports 25A–B and 26 must be noncoplanar with the first plane and the first and second planes must be nonperpendicular (i.e., nonnormal). Of course, all of the point supports 22A–C, 25A–B and 26 must be supported by some means such as a bracket (not shown). Thus, one embodiment of the present invention has been described wherein an object 17 is supported in space by six point supports.

Figure 7:
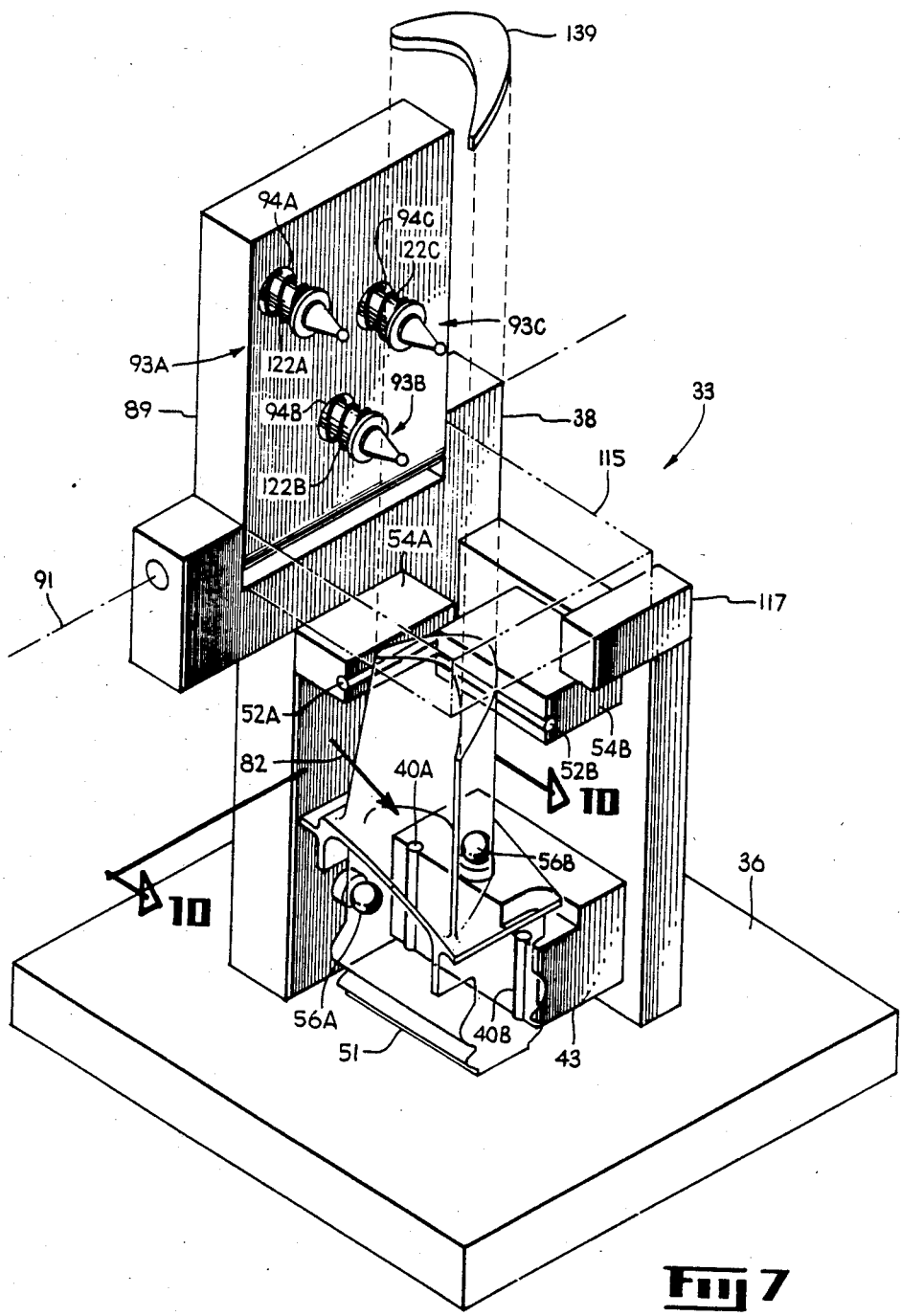
FIG. 7 illustrates one form of the present invention supporting a turbine engine blade.

A second embodiment of the present invention is shown in FIG. 7 wherein a fixturing device 33 is shown having base 36 which supports a right-angled bracket 38. Supported by the bracket 38 is a pair of cylinders 40A and B which fit tightly into holes drilled in a block 43 which is fastened to the bracket 38. The cylinders are parallel. As shown in FIG. 8, portions 45A and B (herein termed edges) of the cylinders 40A and B, protrude beyond surface 48 of the block 43 to provide contact edges for a turbine engine blade, shown as outline 51 in FIG. 7. The cylinders 40A and B are fitted tightly into the holes to reduce bending or other deflection when the blade 51 is in contact with them.

The bracket 38 further supports a pair of nonparallel cylinders 52A and B, which are in this case perpendicular, and are similarly fitted tightly into, and protrude from, cylindrical holes contained in blocks 54A and B. Two spheres 56A and B are fastened respectively to the bracket 38 and to the block 43. The spheres 56A and B as well as the cylinders 40A–B and 52A–B are preferably composed of a hard metal having a Rockwell hardness preferably in excess of 55 and commonly designated as machine steel. The gas turbine engine blade 51 is positioned so that portions of the blade 51 simultaneously contact all four cylinders 40A–B and 52A–B and both spheres 56A and B. That is, these cylinders and spheres provide six point supports analogous to the six point supports discussed in connection with FIGS. 4–6.

Fixturing of the blade will now be described in greater detail. To establish reference directions, a side view of a blade 51 is shown in FIG. 9 affixed to a turbine engine rotor 53 which rotates in the direction shown by arrow 56 about a center 59. The blade 51 is generally aligned in a radial plane (shown as a line 61). The blade has a low pressure side 63 and a high pressure side 65.

Figure 10:
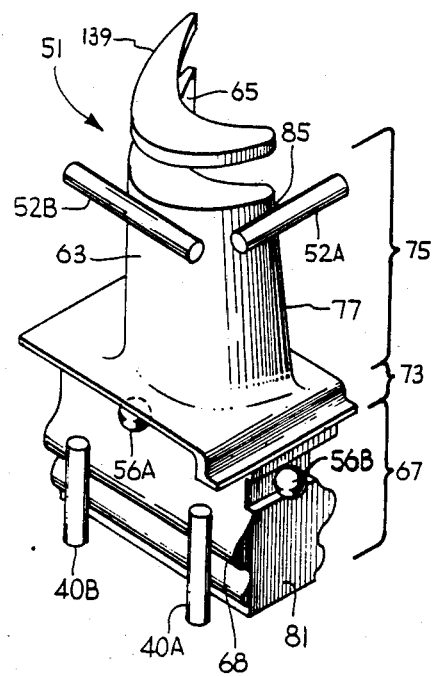
FIG. 10 illustrates in greater detail the support of the blade in FIG. 7.

The blade is also shown in FIG. 10, which is a view of FIG. 7 taken along lines 10—10. The blade 51 comprises a root portion 67 having dovetail pins 68 which mate with dovetail slots 71 in FIG. 9. The blade further comprises a platform 73, and an airfoil portion 75 having a leading edge 77, a high pressure side 65, and a low pressure side 63.

The cylinders 40A and 40B contact dovetail pin 68 on the low pressure side 63 of the blade 51. Sphere 56A contacts the radially inner side of the platform 73 (that is, in FIG. 9, the side toward the center 59 of rotation of the rotor). Sphere 56B contacts an upstream portion 81 of the root portion 67. Cylinder 52A contacts the leading edge 77 of the airfoil portion 75, and cylinder 52B contacts the low pressure side 63 of the airfoil portion 75. The blade 51 is simultaneously urged into contact with all four cylinders 40A and B, 52A and B, and two spheres 56A and B by a clamp (not shown) which exerts a single force at a single point on the blade 51 and generally in the direction of an arrow 82 shown in FIG. 7. It is noted that the application of more than one force can cause a moment to occur about one or more point supports. This is not desired because it may cause the blade 51 to lose contact with other of the point supports.

The cylinders 40A–B and 52A–B, and the spheres 56A and B are herein termed point supports even though, structurally, they do not have points. They are so termed because they contact the respective blade portions at regions, such as region 85 in FIG. 10, which are viewed as theoretically discrete points. These discrete points are tangent points of the spheres and cylinders. Cylinders 40A–B and 52A–B could be replaced by spheres (not shown), but cylinders, in providing elongated, linear edges for the blade to contact, accommodate a greater margin for blade-to-blade variations in size than do spheres.

Figure 11:
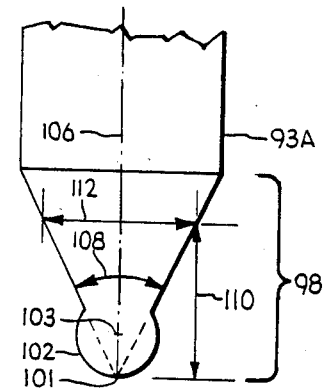
FIG. 11 illustrates in greater detail a feeler pin of the apparatus of FIG. 7.

As shown in FIG. 7, a movable support, such as a pivot plate 89 which pivots about an axis 91, is attached to the bracket 38 and supports three feeler pins 93A–C. The three feeler pins 93A–C are free to slide in three respective holes 94A–C contained in the pivot plate 89. As shown in FIG. 11, the feeler pin 93A (all feeler pins 93A–C are preferably identical) has a conical portion 98 having a geometric apex 101. The conical portion 98 is preferably a portion of a right circular cone. However, in order to reduce damage otherwise inflicted upon the apex 101 through normal wear and tear, a hard steel sphere 102 is fastened to the conical portions 98 at the apex 101, but fastened so that the center 103 of the sphere 102 is positioned on an axis 106 of each cone and a tangent point of each sphere contacts the apex 101. Thus, each cone has a blunted point, but the apex 101 is still defined as a tangent point of the sphere 102. Further, each cone has a apex angle 108 equal to twice the arc tangent of the number one-half (that is, the apex angle 108 is an angle of 53.130 . . . degrees). As shown in FIG. 11, this provides the features that, at any given altitude of the cone (such as altitude 110), the altitude 110 is equal to the width 112. This serves a function which will now be described.

Figure 12:
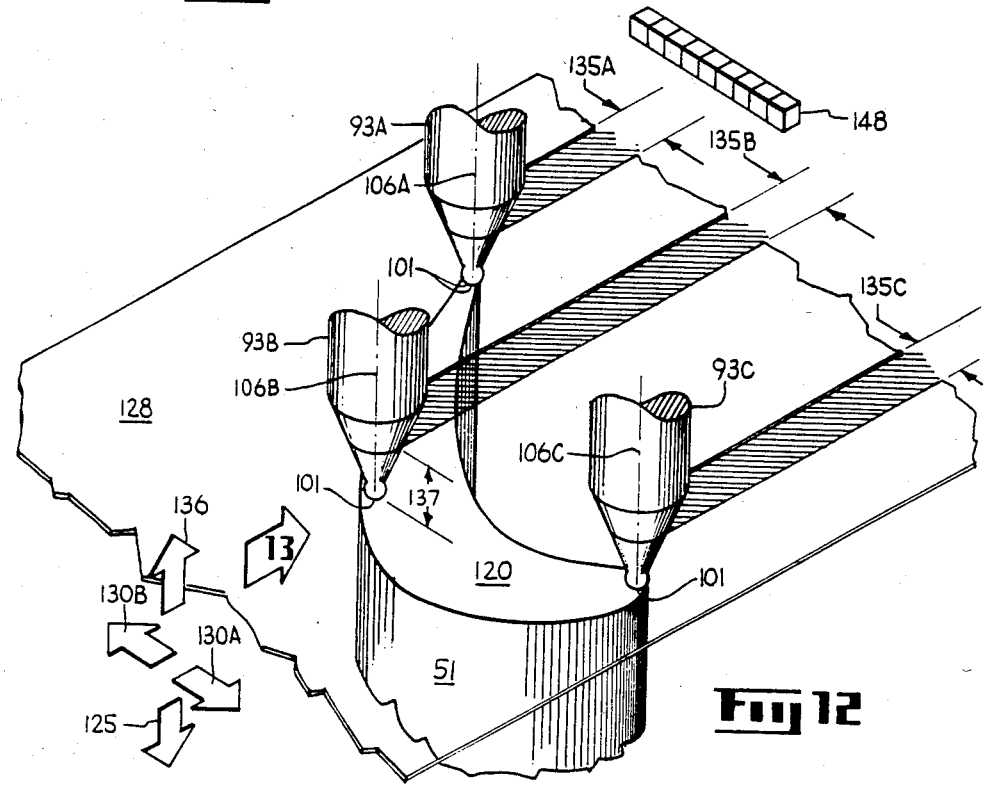
FIG. 12 illustrates three feeler pins of the present invention eclipsing a sheet of light.

To measure the height of a blade 51 in FIG. 7, the pivot plate 89 is rotated to a predetermined position shown by phantom outline 115. The predetermined position is determined by the position of the axis 91 and by a suitable stop 117. As shown in FIG. 12, wherein the pivot plate 89 is removed for clarity, feeler pins 93A–C are brought into contact with the tip 120 of the blade 51 and are firmly held in contact with the tip 120 of the blade 51 by springs 122A–C shown in FIG. 7 which urge the feeler pins in the direction indicated by arrow 125 in FIG. 12. Thus, the apex points 101 are brought into contact with the tip 120, and the axes 106A–C of the feeler pins 93A–C are positioned generally parallel to the radial plane 61 shown in FIG. 9.

A sheet of light 128 is projected across the feeler pins 93A–C and perpendicular to the axes 106A–C. While termed a sheet of light, the sheet 128 actually comprises a cylindrical laser beam (not shown) scanned in the direction of arrows 130A and B so as to cover a swath resembling a sheet. One apparatus which is commonly used to provide such a sheet of light is a scanning laser dimensioning system such as one available as Telemetric Model 121 available from Zygo Corp., Middlefield, Ct. Each feeler pin 93A–C eclipses a respective eclipsed region 135A–C of the sheet 128 and the width of each eclipsed region is measured by photosensitive equipment known in the art. One such type of equipment is included in the Telemetric Model 121 just mentioned. A photodiode array 148 known in the art and shown in FIG. 12 can also be used to produce signals indicative of the width of the eclipsed region.

Since the width 112 in FIG. 11 equals the altitude 110 of each feeler pin 93A–C, measurement of the width of each eclipsed region 135A–C provides an indication of the distance 137 in FIG. 12 between the tip 120 and the sheet of light 128. Thus, the height of the blade 51 with respect to the sheet of light 128 is ascertained. Since the sheet 128 is considered to be a reference fixed in space, the distance from the tip 120 to a reference is thus ascertained. Further, since three feeler pins 93A–C contact the blade tip 120, three points thereon are measured in distance from the sheet of light 128. These three points define a plane of the surface of the tip 120 and the measurement of the displacement of entire plane of the surface of the tip 120 after welding will now be discussed.

This embodiment can be utilized to inspect the quality of the weldment when a tip cap 139 in FIG. 7 is diffusion-bonded to the tip 120 of the blade 51. First, the blade 51 is positioned in the fixturing device 33 described above and the tip cap 139 is positioned between the feeler pins 93A–C and the blade 51. This positioning simulates the actual position which the tip cap 139 will assume when bonded to the blade 51. The feeler pins are brought into contact with the tip cap 139 and the width of the eclipsed region 135A–C in FIG. 12 of each is measured (the tip cap 139 is not shown in FIG. 12 positioned atop the blade tip 120). The blade is removed, a layer of metal welding material is placed between the tip cap 139 and the tip 120, and the blade assembly is heated in a furnace. In the case of a layer of weld material which is 3 mils thick (that is, three thousandths of an inch), it is commonly assumed that the final weld, if properly executed, will separate the tip cap 139 and the blade tip 120 by a distance of 1 mil. After diffusion bonding, the blade 51, together with the bonded tip 139 are again measured in height. The second measurement will, if resulting from a suitable diffusion bond, be one mil less than the pre-bond measurement. That is, each apex point 101 will be displaced one mil in the direction of arrow 136 in FIG. 12 and the sheet of light 128 will strike each conical region 98 in FIG. 11 at a region of lesser width 112 than before. Deviation of the displacements from a predetermined number such as one mil indicates a possibly defective diffusion bond. Nonuniform displacement of one apex point 101 with respect to another indicates that the plane of the surface of the tip 120 was displaced nonuniformally and thus indicates the possible existence of a partial fault in the weldment.

It is recognized that the sheet of light 128 is not infinitesimally thin, but will possess some finite thickness. Thus, the portion 135A in FIG. 12 eclipsed by the feeler pin 93A of FIG. 11 will have the general shape shown in FIGS. 13A–B. When the feeler pin 93A is displaced in the direction of arrow 136 in FIG. 12, a new eclipsed portion 135AA in FIG. 13B will be generated as shown by sheet portions 128A. The eclipsed portion 135AA will be narrower than eclipsed portion 135A: width $150^1$ is less than width 150.

The fact that the eclipsed portion 135A possesses a nonuniform width (as shown by widths 150 and 151) presents no significant problem. The change in width of any one of the widths, such as width 150, is sought to be measured. Measuring such a change is known in the art.

Further, in the discussion relating to FIG. 12, it was stated that a measurement is undertaken between the sheet of light 128 as a reference and the tip 120 of the blade 51. Of course, this assumes that the sheet of light 128, even though having a finite thickness 160 as shown in FIG. 13A, can be viewed as defining a discrete reference position, such as lower edge 156. This is a matter of calibration. Such calibration is known in the art and is not part of the present ivention.

Apparatus have been described having one embodiment for supporting an object such as a gas turbine engine blade accurately and repeatably in space. The blade is supported by six point supports of which four are supplied by rigidly positioned cylinders and two are supplied by rigidly positioned spheres. Feeler pins having blunted conical regions are supported on a movable support and the apex of each conical tip is brought into contact with the tip of the blade. A sheet of light is shone onto each conical region, and the relative altitude, which is a function of the radial height of the blade, at each contact point of the apex is determined by the width of the light eclipsed. In contacting the tip at three points, a triangle is defined which, is as well known, defines a plane. Thus, the location of the plane of the tip is defined, and displacement of this plane following diffusion bonding is measured.

Numerous substitutions and modifications can be undertaken without departing from the invention as defined by the spirit and scope of the following claims.

What is desired to be secured by Letters Patent of the United States is the following.

I claim:

1. Apparatus for supporting an object at an accurately known position, comprising:
   (a) a bracket;
   (b) first, second, and third point supports for contacting the object at first, second, and third contact points, the three contact points defining a first plane;
   (c) fourth and fifth point supports for contacting the object at fourth and fifth contact points, the fourth and fifth contact points defining a line which is nonperpendicular to the first plane of (b); and
   (d) a sixth point support for contacting the object at a sixth contact point, the sixth contact point
      (i) being noncoplanar with the plane of (a),
      (ii) being noncolinear with the line of (c), and
      (iii) defining with the fourth and fifth contact points a second plane which is nonperpendicular with the plane of (b);
   the six point supports being located at predetermined positions with respect to the bracket.

2. Apparatus for supporting a gas turbine engine blade which has a root having an upstream portion and a dovetail portion; a platform having a radially inner side; and an airfoil having a tip, a leading edge, and a low pressure side, comprising:
   (a) a bracket;
   (b) a spherical first support positioned at a first predetermined position with respect to the bracket for supporting the upstream portion of the root;
   (c) a spherical second support positioned at a second predetermined position with respect to the bracket for supporting the platform;
   (d) cylindrical third and fourth supports positioned at respective third and fourth predetermined positions with respect to the bracket for supporting the dovetail portion;
   (e) a cylindrical fifth support positioned at a fifth predetermined position with respect to the bracket for supporting the low pressure side; and
   (f) a cylindrical sixth support positioned at a sixth predetermined position with respect to the bracket for supporting the leading edge.

3. Apparatus according to claim 2 and further comprising a clamp for applying a force at one point on the blade for urging the blade into simultaneous contact with all of the supports.

4. Method of measuring a dimension of an object, comprising the steps of:
   (a) positioning the object in a fixture;
   (b) positioning the apex of a cone against the object;
   (c) projecting a sheet of light across the cone for eclipsing of the light; and
   (d) measuring the amount of light eclipsed in (c).

* * * * *